United States Patent [19]

Tersiev

[11] Patent Number: 4,953,402

[45] Date of Patent: Sep. 4, 1990

[54] WIND MEASURING SYSTEM (ANEMORHUMBOMETER)

[75] Inventor: Valentin S. Tersiev, Sofia, Bulgaria

[73] Assignee: TK "Orgtechnika", Silistra, Bulgaria

[21] Appl. No.: 395,122

[22] Filed: Aug. 16, 1989

[30] Foreign Application Priority Data

Aug. 16, 1988 [BG] Bulgaria .................................. 85256

[51] Int. Cl.$^5$ ............................................. G01W 1/02
[52] U.S. Cl. ...................................................... 73/189
[58] Field of Search ........................................... 73/189

[56] References Cited

U.S. PATENT DOCUMENTS

| | | | |
|---|---|---|---|
| 3,094,869 | 6/1963 | Wehmann | 73/189 |
| 3,541,855 | 11/1970 | Frenzen et al. | 73/189 |
| 4,488,431 | 12/1984 | Miga | 73/189 |

Primary Examiner—Donald O. Woodiel
Attorney, Agent, or Firm—Klein & Vibber

[57] ABSTRACT

A wind measuring system can be used in meterology for a more accurate and reliable measurement of the velocity and the direction of an air current. The system has a sensor for velocity and a wind vane with sensors for horizontal and vertical wind directions. Depending on the velocity of the air current, a reference disc is rotated which generates pulses for each revolution. Horizontal air direction pressure is transmitted to bearing axles and a gear to cause rotational motion of a transducer for horizontal direction. Vertical air direction pressure rotates a transducer for vertical direction. The phase difference of the pulses from the transducers produces time delays which are recorded by a unit for electronic processing of the information. An output is generated indicating wind speed and direction.

6 Claims, 1 Drawing Sheet

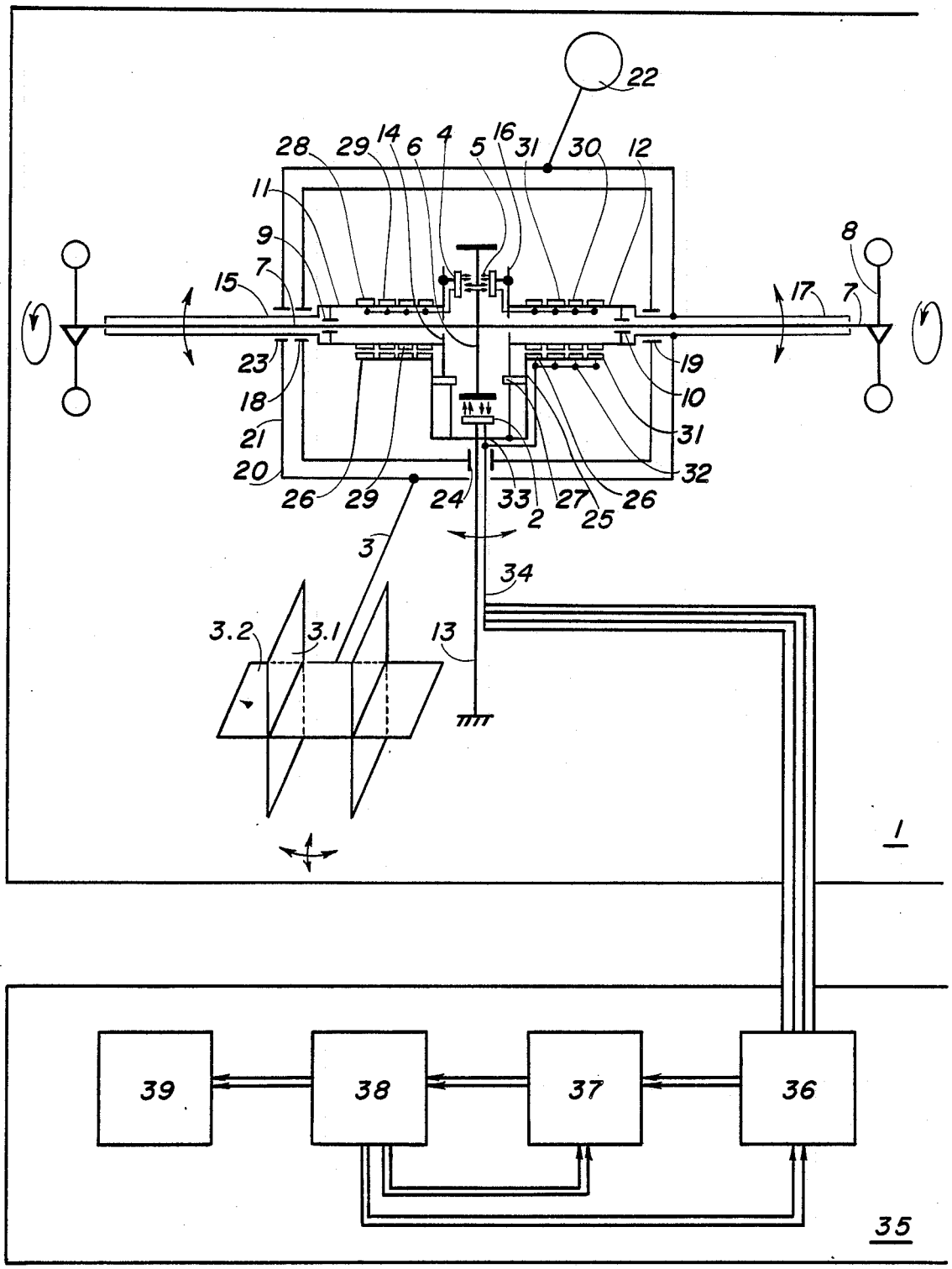

WIND MEASURING SYSTEM (ANEMORHUMBOMETER)

FIELD OF THE INVENTION

This invention relates to a wind measuring system (anemorhumbometer) which can be used for the measurement of the velocity and the direction of air currents and in the automated processing of weather data in meteorology, agriculture, transportation, building-construction, sports, environmental control, etc.

BACKGROUND OF THE INVENTION

A known wind measuring system is disclosed in Bulgarian Inventor's Certificate 33844. The known system measures the direction of the air current without reading the vertical component of the current. Its transducer unit comprises a velocity sensor with a reference disc, a velocity transducer mounted on a carrying axle opposite to the face side of the reference disc, and a transducer for measuring the horizontal direction component of air velocity mounted opposite to the one side surface of the reference disc. Both transducers are provided with one grounded output, the second output of the velocity transducer being directly connected to one output of the transducer unit, while the second output of the transducer for direction is connected via a commutator and brushes to the second output of the transducer unit. The outputs of the transducer unit are respectively connected to the inputs of a unit for electronic processing of the information.

The drawback of the known wind measuring system is that it does not measure the vertical component of the air current, and this results in reduced accuracy and reliability of the information obtained.

SUMMARY OF THE INVENTION

It is therefore a general object of the invention to develop a wind measuring system featured by an increased accuracy and reliability of the obtained information.

This object is achieved by a wind measuring system which includes a transducer unit having a transducer for air velocity measurement mounted on a carrying axle opposite to the face side of a reference disc, which is connected to a sensor for the velocity, and a transducer for horizontal direction which is mounted on the housing opposite to one side surface of the reference disc, which is connected to a wind vane comprising a sensor for horizontal direction. Both transducers are provided with one grounded output each, the second output of the transducer for velocity being directly connected to one output of the transducer unit. The second output of the transducer for direction is connected via a commutator and brushes to the second output of the transducer unit, and the outputs of the transducer unit are respectively connected to the inputs of a unit for electronic processing of the information.

The wind measuring system according to the invention is characterized by the housing being rigidly connected to a wind vane which comprises a sensor for the vertical direction component of wind. The connection between the transducer for horizontal direction and the housing is effected by means of a wheel with commutator body and a bearing axle perpendicular to the carrying axle. The wheel contacts the carrying axle by means of a gear.

The transducer unit also contains a transducer for vertical direction which is disposed opposite to the transducer for horizontal direction on the other side surface of the reference disc, on a second wheel fixed on a second commutator body mounted on the wind vane by means of a second bearing axle which is coaxial to the first one and is rigidly connected to the housing, being seated in an internal housing, in which there are seated the first bearing axle and the carrying axle.

One output of the transducer for vertical direction is the third output of the transducer unit, while its second output is grounded.

The advantages of the wind measuring system according to the invention include the ability to measure the vertical component of the wind direction in its whole range simultaneously with the measurement of the horizontal component and the velocity of the air current. Depending on the velocity of the sensor for velocity and thus, at zero velocity of the sensor for velocity, there will not be generated useful signals for the horizontal and the vertical component of the direction, this being an indication of calm. Moreover, the useful signals pass at most through one contact surface of the relatively moving components; they have a time-pulse character and thus provide the ability for digital conversion with high accuracy and easy applicability in automated systems for data processing.

BRIEF DESCRIPTION OF THE DRAWING

With these and other objects in view, which will become apparent in the following detailed description, the present invention, which is shown by example only, will be clearly understood in connection with the accompanying drawing, in which the single FIGURE is a schematic perspective view and block diagram a preferred embodiment of the invention.

DESCRIPTION OF THE PREFERRED EMBODIMENT

Referring now to the FIGURE, transducer unit 1 contains an optron 2 for air velocity, which also serves as a reference mark for initial direction (geographical north of the equator of the trajectory of the wind vane 3, for example) and optrons 4 and 5 for the horizontal and vertical component of the direction, respectively.

Wind vane 3 comprises a sensor for horizontal direction 3.1 and a sensor for vertical direction 3.2. Reference disc 6 is fastened to axle 7 of cup wheel 8, which is seated by means of bearings 9 and 10 in respective commutator bodies 11 and 12.

The optron 2 is rigidly fastened to axle 13, while the optrons 4 and 5 are movable and are attached, respectively, to toothed wheel 14 with the commutator body 11 and bearing axle 15, and to wheel 16 with the commutator body 12 and bearing axle 17.

The bearing axles 15 and 17 are seated by means of bearings 18 and 19 in a housing 20 of the transducer unit 1. The axle 15 is also seated by means of bearing 23 in housing 21 of the wind vane 3. Balance mass 22 is attached to housing 21 of the wind vane 3, and the axle 17 is rigidly fastened to the housing 21 of the wind vane 3.

The housing 20 of the transducer unit 1 is seated by means of bearing 24 with carrying axle 13 to which there is rigidly fastened brush-holding body 25 with the four concentric brushes 26 and toothed disc 27 pressed into the body 25.

Wires 28 of optron 4 are respectively connected with the commutator rings of commutator 29, while the wires 30 of optron 5 are respectively connected with the commutator rings of commutator 31. The brushes 26 are in contact simultaneously with the commutators 29 and 31 and are connected to wires 32, which together with wires 33 of the optron 2 form interface 34, which is connected to unit 35 for electronic processing.

Unit 35 for processing of signals from the optrons contains a logic matching unit 36, the outputs of which are fed to a counting unit 37, the outputs of which are fed to arithmetic logic unit 38, which is provided with outputs to indicating unit 39 and feedback to units 36 and 37.

MANNER OF OPERATION

The operation of the wind measuring system, according to the invention, is as follows:

The reference disc 6 is rotated by means of the axle 7 of the cup wheel 8 corresponding to the velocity of the air current. By reference marks of relfection, modulated signals of the optrons 2, 4 and 5 are generated for every revolution of axle 7 regardless of the direction of the air current.

In case of side air current (horizontal component), the air pressure is transmitted to the bearing axle 15 and 17 by means of the sensor for horizontal direction 3.1 of the wind vane and the housing of the wind vane 21, which axle 15, 17 drive the housing of the transducer 20 by means of bearing 24 around the axle 13. In this rotation, by means of the immovable toothed disc 27, there is transmitted a rotational motion to the toothed wheel 14 which carries the optron 4. The rotation is infinite, and this corresponds to a full circle of 0 to 360 degrees of the wind vane 3, and 0 to 360 degrees respectively of the optron 4.

In case of a vertical component of the air current, there is effected a pressure on the housing of the wind vane 21, again by means of the wind vane 3 with the sensor for vertical direction 3.2, but this time in a vertical direction. It rotates around its axis, coinciding with the bearing axle 17, the motion is transmitted by the commutator body 12 and the wheel 16 of the optron 5 which can describe an arc of 180 degrees, corresponding to an air current coming from the base of the transducer module 1 to its opposite direction, hitting the transducer vertically.

Because of the phase differences of the movable optrons 4 and 5 with respect to the immovable optron 2 and as a result of the circumstance that the reference disc 6 rotates only in one direction, there are formed time delays as a function of the speed of rotation of disc 6, which are measured by three counters in the counting unit 37. The results obtained by this unit are calculated in the arithmetic logical unit 38 according to the following relationships:

For the velocity of the air current: V (in meters per second)=$A/n_1$, where A=constant of the wind measuring system and $n_1$=number of time pulses for one full revolution of the reference mark of the optron 2.

For the horizontal component of the air current: [phi] (in degrees)=360 $(n_2/n_1)$, where $n_2$=number of time pulses for the phase shift of optron 4 with respect to optron 2 within one revolution.

For the vertical component of the air current: [psi] (in degrees)=360 $(n_3/n_1)-90$, where $n_3$=number of time pulses for the phase shift of optron 5 with respect to optron 2 within one revolution.

The information enters the indicating unit 39 which indicates in digital form the results for the velocity of the air current in meters per second and for the direction of the air current in degrees as follows:

For the horizontal component, from 0 to 360 (0 being the geographical north) and for the vertical component, $-90$ to $+90$ (0 being the equator of the trajectory of the wind vane 3).

For the next following cycle of measurement, the counters of the counter unit 35 are set to zero and everything starts from the beginning.

In "calm" mode the cup wheel is at reset and there are no time delays in the measurement; this corresponds to zero velocity and absence of direction, i.e., there is no motion of the air.

While a specific embodiment of the invention has been shown and described in detail to illustrate the application of the principles of the invention, it will be understood that the invention may be embodied otherwise without departing from such principles.

I claim:

1. A wind measuring system comprising
a velocity sensor, a horizontal direction sensor and a vertical direction sensor;
said velocity sensor comprising a reference disk and a first stationary optical sensor, said reference disk being mechanically driven to rotate in a first direction by a velocity component of the wind, said first optical sensor sensing the speed of rotation of said reference disk in said first direction;
said horizontal direction sensor comprising a second optical sensor movable relative to said reference disk, movement of said second optical sensor being mechanically driven in a direction parallel to said first direction by a horizontal direction component of the wind, said second optical sensor sensing a position relative to said first optical sensor by reference to said reference disk;
said vertical direction sensor comprising a third optical sensor movable relative to said reference disk, movement of said third optical sensor being mechanically driven in a direction parallel to said first direction by a vertical direction component of the wind, said third optical sensor sensing a position relative to said first optical sensor by reference to said reference disk; and
circuit means for calculating wind velocity and horizontal and vertical wind direction based respectively on the speed of rotation of the reference disk and the positions of the second and third sensors relative to the first sensor.

2. A wind measuring system as claimed in claim 1 wherein
said reference disk is provided with a plurality of reflective reference marks, said optical sensors being stimulated by reflection of light by said reference marks.

3. A wind measuring system as claimed in claim 2 wherein
stimulation of said sensors by said reference marks causes said sensors to emit pulses and the horizontal and vertical direction components of the wind are calculated by measuring the phase difference in pulses emitted by respective second and third sensors to the pulses emitted by said first sensor.

4. A wind measuring system comprising
a first inner housing mounted for rotation about a vertical axis and a second outer housing mounted for rotation about both a horizontal and a vertical axis;

a velocity sensor, a horizontal direction sensor and a vertical direction sensor;

said velocity sensor comprising wind resisting means attached to a rotating axle, whereby movement of wind causes said axle to rotate;

said axle being mounted for free rotation in said first housing;

velocity measurement means coacting with said axle whereby wind velocity is determined from speed of rotation of said axle, said velocity measurement means comprising an optical sensor mounted stationary relative to said axle;

said horizontal and vertical direction sensors comprising a wind vane fixedly mounted to said second housing, whereby horizontal movement of wind causes said second housing to rotate about said vertical axis and vertical movement of wind causes said second housing to rotate about said horizontal axis;

horizontal direction measurement means coacting with said velocity measurement means whereby horizontal wind direction is determined from the relative position of the horizontal direction measurement means relative to the velocity measurement means, said horizontal direction measurement means comprising an optical sensor movable relative to said velocity measurement means by horizontal movement of said horizontal direction sensor;

vertical direction measurement means coacting with said velocity measurement means whereby vertical wind direction is determined from the relative position of the vertical direction measurement means relative to the velocity measurement means, said vertical direction measurement means comprising an optical sensor movable relative to said velocity measurement means by vertical movement of said vertical direction sensor.

5. A wind measuring system as claimed in claim 4 further comprising circuit means for converting signals from said optical sensors to wind speed and direction indices.

6. A wind measuring system as claimed in claim 4 further comprising said axle being provided predetermined indicia of optical reflectivity, said optical sensors reacting to said indicia of reflectivity to generate a series of pulses whereby rate of pulses is used to determine wind velocity and phase relationship of pulses from said optical sensors is used to determine wind direction.

* * * * *